June 12, 1956  E. C. MILLER  2,750,511
ANALYZER
Filed Dec. 5, 1952  3 Sheets-Sheet 1

INVENTOR.
E. C. Miller
BY Hudson & Young
ATTORNEYS

June 12, 1956 E. C. MILLER 2,750,511
ANALYZER

Filed Dec. 5, 1952 3 Sheets-Sheet 2

INVENTOR.
E. C. Miller
BY
Hudson & Young
ATTORNEYS

June 12, 1956      E. C. MILLER      2,750,511
ANALYZER

Filed Dec. 5, 1952      3 Sheets-Sheet 3

INVENTOR.
E. C. Miller
BY
Hudson & Young
ATTORNEYS

United States Patent Office 2,750,511
Patented June 12, 1956

2,750,511

ANALYZER

Elmer C. Miller, Bartlesville, Okla., assignor to Phillips Petroleum Company, a corporation of Delaware Application December 5, 1952, Serial No. 324,298

12 Claims. (Cl. 250—43.5)

This invention relates to a method of and apparatus for detecting the presence of acetylenes. In another aspect it relates to a filter system for use in a double beam infrared analyzer.

In recent years the production of butadiene has become increasingly important because of its use in the manufacture of synthetic rubber. However, to obtain butadiene having the necessary purity required for successful polymerization into synthetic rubber, means must be provided for separating butadiene from the numerous other hydrocarbons normally formed along with the butadiene by the cracking or dehydrogenation of selected hydrocarbons. Under present synthetic rubber manufacturing conditions it is required that the butadiene purity be not less than approximately 98.0 mol per cent and further that not more than approximately 0.1 weight per cent total acetylenes be present therein. One particular process that has been found to be valuable in accomplishing this separation is described in United States Patent 2,415,006. In the system therein described the last step of the separation is one of fractional distillation of a feed stream containing predominantly butadiene, butene-2 and acetylenes into an overhead butadiene product stream and a butene-2, acetylenes bottoms stream.

The acetylenes which normally appear in the butadiene fractionating column feed stream are methyl acetylene, vinyl acetylene and ethyl acetylene. Methyl acetylene is a more volatile component than butadiene and for the most part is removed by the separation process described in the Hachmuth patent prior to the feed stream entry into the last fractionating column. However, some methyl acetylene does appear in the fractionating column feed stream. Vinyl and ethyl acetylenes are less volatile than butadiene, but in the presence of butadiene and butenes under distillation conditions these acetylenes act in a non-ideal fashion, that is their volatility relative to butadiene is not constant but is some complex function of composition. This leads to a peculiar distillation action within the column which results in the concentration gradient of the total acetylenes exhibiting a maximum in the lower region of the column. The maximum concentration reached and the physical location of this maximum are functions of the acetylene concentration in the feed stream and the specification butadiene product purity. Thus by continuously measuring the concentration of acetylenes in the region of this maximum, valuable information is obtained relating to the operation of the fractionating column.

The present invention is directed primarily toward providing an instrument that is capable of analyzing continuously and automatically a sample stream to determine the presence and concentration of acetylenes therein. This instrument is based upon the property of certain heteratomic molecules to absorb infrared radiation of wave lengths characteristic of the particular molecules. The intensities of radiation of two infrared beams emitted from a common source are compared by means of temperature sensitive resistance elements forming arms of an electrical bridge circuit. Both of the beams pass through a common sample cell containing the material under analysis and also through suitable filters to limit the total radiation transmitted to a rather narrow band of selected wave lengths. One of the beams is further directed through a plate of spinel which has been found to have radiation absorption characteristics approximating those of the acetylenes. In this manner a comparison of the intensities of the two resulting beams provides a direct indication of the concentration of the acetylenes present in the sample cell, providing the stream under analysis does not contain other components having radiation absorption bands in the selected transmitted band of wave lengths.

Accordingly, it is an object of this invention to provide a method of detecting the presence of acetylene in a fluid sample.

Another object is to provide apparatus for continuously analyzing a sample stream for acetylenes contained therein.

A further object is to provide an optical filter system for an infrared analyzer adapted to detect acetylenes.

Various other objects, advantages and features of this invention should become apparent from the following detailed description taken in conjunction with the accompanying drawing in which.

Figure 1:
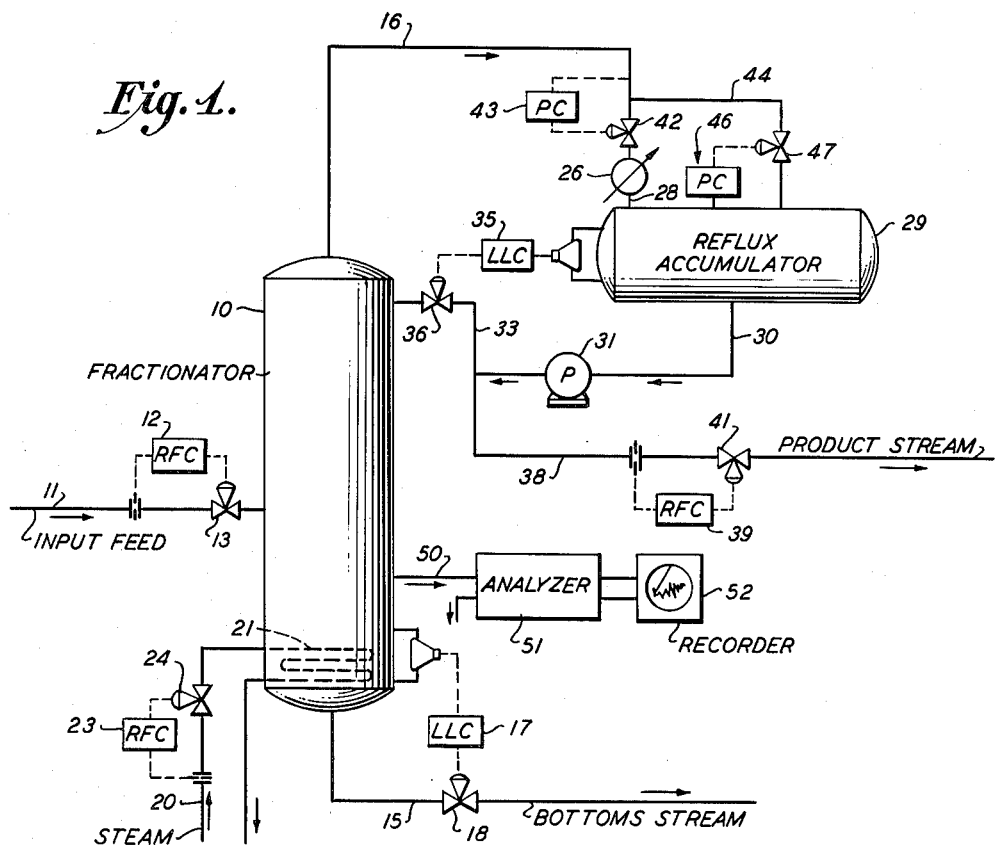
Figure 1 is a schematic representation of a fractionating column and the analyzer of this invention associated therewith.

Referring now to the drawing in detail and to Figure 1 in particular there is shown a fractionating column 10 of any suitable design employing contacting means such as perforated plates, bubble decks or the like. The feed mixture to be separated is supplied through an inlet line 11 at a rate controlled by a conventional rate-of-flow controller 12 which adjusts a valve 13 in line 11. A representative analysis of the feed mixture is as follows:

| Component: | Mol percent |
|---|---|
| Butadiene | 92.6 |
| Total acetylenes | 0.2 |
| Butene-2 (trans) | 3.0 |
| Butene-2 (cis) | 3.2 |
| Normal butane | 0.3 |
| Butene-1 | 0.7 |

This feed mixture is separated within the column into a liquid bottoms stream which is withdrawn through a line 15 and into a lower boiling overhead vaporous or gaseous stream which is withdrawn through a line 16. The rate of withdrawal of the bottoms stream through line 15 is regulated by a liquid level controller 17 which adjusts a valve 18 in line 15 in accordance with the liquid level in the bottom of column 10. Heat is supplied to the lower region of column 10 through a steam line 20 communicating with coils 21. The amount of heat supplied to column 10 is regulated by a rate-of-flow controller 23 which adjusts a valve 24 in steam line 20.

The vapors and/or gases comprising the relatively light components of the feed mixture which are not retained in the heavier reboiled bottoms fraction are directed from the upper portion of the fractionator through line 16 to a condenser 26 wherein they are partially or completely condensed as desired and wherefrom the resulting condensate is directed through a line 28 to a reflux accumulator 29. The total quantity of distillate collected in accumulator 29 is discharged through a line 30 having a pump 31 therein. A portion of the distillate passing through pump 31 is directed through a line 33 back into fractionator column 10 at a rate regulated by a liquid level controller 35 which adjusts a valve 36 in line 33 in accordance with the liquid level in accumulator 29. The remainder of the distillate passing through pump 31 is directed through an overhead product line 38 at a rate maintained by a rate-of-flow controller 39 which adjusts a valve 41 in line 38. In order to maintain the desired operating pressure in column 10 an automatic pressure control valve 42, responsive to a pressure controller 43, is provided in line 16. A line 44 serves to by-pass condenser 26 to compensate for the pressure drop due to the lower vapor pressure of the collected condensate. The rate of flow through line 44 is regulated by a pressure controller 46 which adjusts a valve 47 in line 44 responsive to the pressure in accumulator 29.

Figure 2:
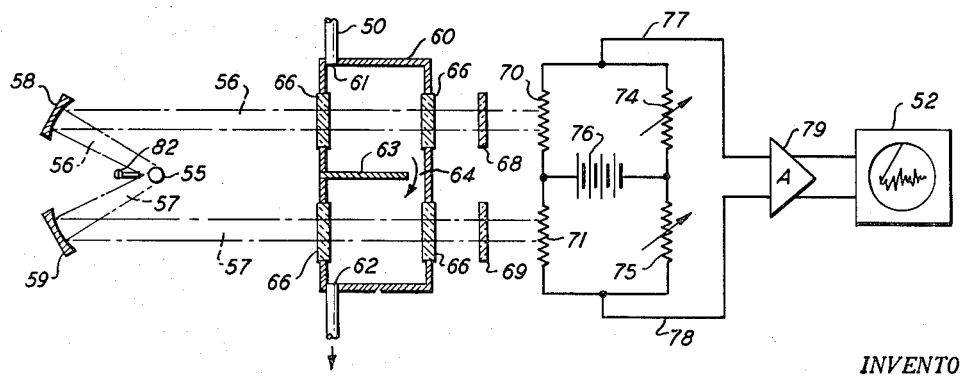
Figure 2 is a schematic view of the analyzer including the optical filter system.

In order to determine the acetylenes concentration at a preselected region of column 10 a sample stream is continuously withdrawn through a line 50 which communicates with analyzer 51, the output signal of which is applied to a recorder 52. As shown in greater detail in Figure 2, analyzer 51 includes a source of infrared radiation 55, which can be a heated Nichrome wire, from which two beams of radiation 56 and 57 are directed against a pair of respective front surface concave reflectors 58 and 59. The two radiation beams are directed by these reflectors through a common sample cell 60 having an inlet opening 61 connected to line 50 and having an outlet opening 62. Cell 60 preferably is divided by a partition 63 having an opening 64 positioned at the opposite end of the cell from the inlet and outlet openings. This assures continuous circulation of the sample stream throughout the cell. Cell 60 is provided with thin quartz windows 66 which are transparent to infrarer radiation at wave lengths corresponding to the absorption bands of interest of the acetylenes under analysis. Radiation beams 56 and 57 pass through common cell 60 and through respective filters 68 and 69 to impinge upon respective temperature sensitive electrical resistance elements 70 and 71. Filter 68 is formed of spinel ($MgO \cdot 3.5Al_2O_3$) which has an absorption band at the same wave length as one of the principal absorption bands of the acetylenes, and filter 69 is formed of quartz ($SiO_2$) or sapphire ($Al_2O_3$). Elements 70 and 71 are thermistors having a high temperature coefficient of thermal resistivity, for example, bolometers. Radiation impinging upon elements 70 and 71 thus produce changes in the electrical resistivity thereof. With the apparatus arranged as described, differences in resistance of the two elements 70 and 71 are representative of the amount of acetylenes present in the sample stream circulated through cell 60.

Elements 70 and 71 are connected in a Wheatstone bridge circuit with balancing variable resistors 74 and 75. A source of voltage 76 is connected across first opposite terminals of the bridge circuit and output leads 77 and 78 are connected to the second pair of opposite terminals of the bridge circuit. Leads 77 and 78 are connected to the input terminals of an amplifier 79, the output of which is applied to recorder 52. The bridge circuit is initially balanced with no acetylenes or with a known quantity of acetylenes present in cell 60. This balance is obtained by adjustment of resistors 74 and 75 and/or by rotation of a trimmer 82 which comprised a small opaque vane rotatable into either of radiation beams 56 or 57 to reduce the intensity thereof. Thus any change in concentration of acetylenes in the sample passed through cell 60 results in unbalance of the bridge circuit due to the change in amount of radiation absorbed by the acetylenes. The potential difference between leads 77 and 78 representing this unbalance is amplified and recorded.

As an example of a preferred embodiment of this invention satisfactory results have been obtained with an analyzer employing a sample cell 60 approximately 15 centimeters long with quartz windows 66 approximately 1.5 millimeters thick. Quartz filter 69 was also approximately 1.5 millimeters thick and spinel filter 68 was approximately 4.0 millimeters thick.

Figure 5:
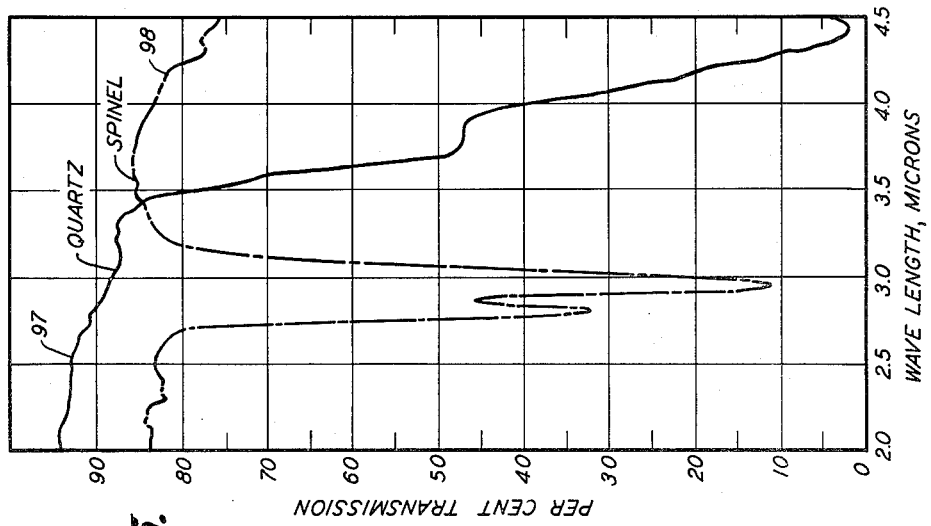
Figures 3, 4, and 5 illustrate infrared absorption characteristics of selected materials.
Figure 3:
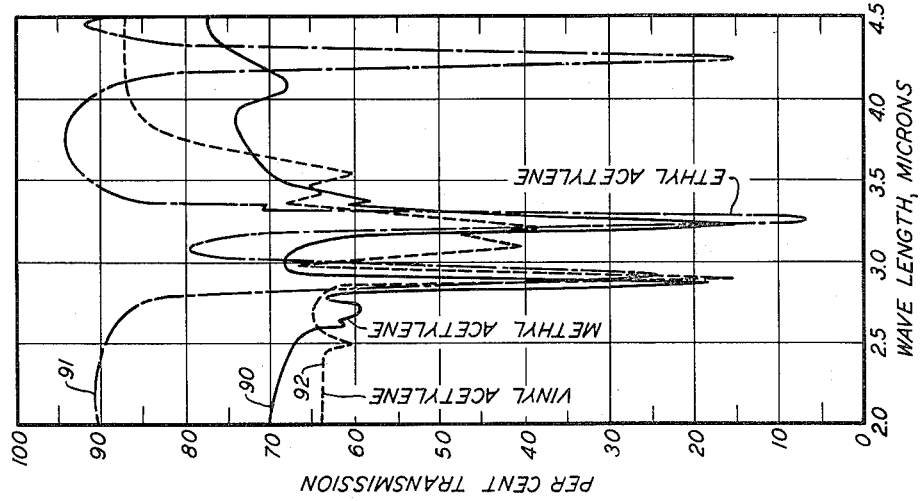
Figure 4:
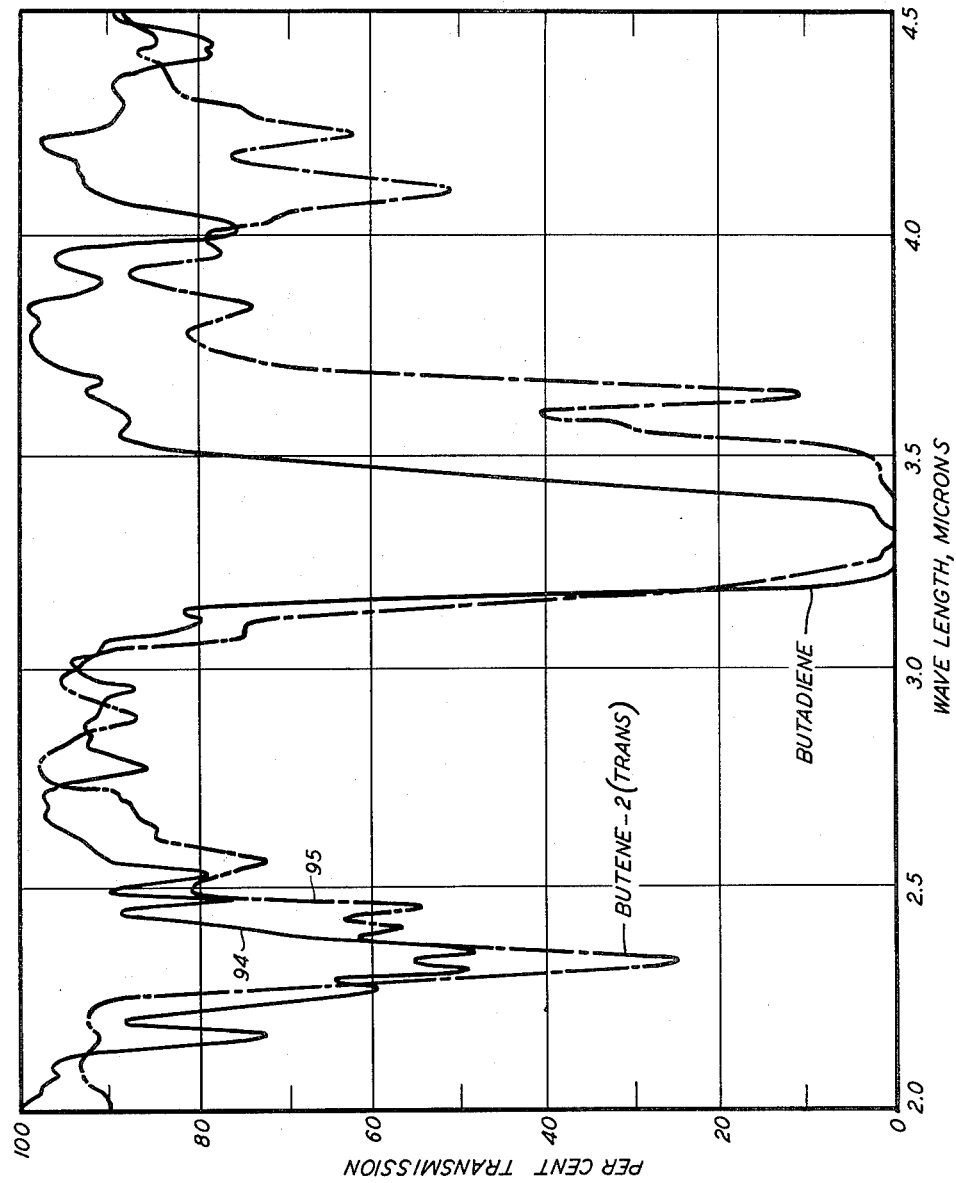

The operation of the filter system of this invention which enables the analyzer to detect acetylenes in the presence of butenes and butadiene can best be explained in conjunction with the graphs of Figures 3, 4, and 5. The curves 90, 91 and 92 of Figure 3 represent the per cent transmission of infrared radiation of various wave lengths passed through a sample cell ten centimeters long containing, respectively, methyl acetylene, ethyl acetylene and vinyl acetylene; the curves 94 and 95 of Figure 4 represent the per cent transmission of infrared radiation of various wave lengths passed through a sample cell ten centimeters long, containing, respectively, butadiene and butene-2 (trans); and the curves 97 and 98 of Figure 5 represent the per cent transmission of infrared radiation of various wave lengths passed through a plate of quartz 4.0 millimeters thick and through a plate of spinel 4.0 millimeters thick, respectively. From an inspection of these curves it can be seen that the three acetylenes and spinel each have distinctive absorption bands at approximately 2.9 microns; the transmission of quartz decreases rapidly at wave lengths longer than approximately 3 microns; and both butadiene and butene-2 (trans) have wide absorption bands in the region between approximately 3 microns and approximately 3.5 microns. Thus with sample cell 60 empty the quantity of radiation impinging upon element 71 is represented by the area under curve 97 in Figure 5 and the quantity of radiation impinging upon element 70 is represented by the area under curve 98 which is also under curve 97. This should be evident because both beams of radiation pass through quartz windows 66 while beam 56 also passes through spinel filter 68. Quartz filter 69 is included in beam 57 to compensate for the radiation absorbed by filter 68 such that electrical balance of the bridge circuit is more readily obtained. When cell 60 contains a mixture of butadiene and butenes the total resulting radiation of the two beams is decreased by the amount of radiation absorbed by these latter components. However, since both beams pass through cell 60 the decrease in radiation transmitted by the two beams remains the same.

If the sample stream circulated through cell 60 should contain acetylenes, the total quantity of radiation impinging upon element 71 is reduced by the amount of radiation absorbed by the acetylenes present in the sample stream. The larger the percentage of acetylenes present the greater the reduction in radiation transmitted. However, the presence of acetylenes in cell 60 does not affect the quantity of radiation transmitted to element 70 because the radiation absorbed by the acetylenes previously was removed from beam 56 by spinel filter 68. Thus any change in concentration of acetylenes present in cell 60 results in a change in the differential intensity of total radiation impinging upon elements 70 and 71. This change in radiation is indicated on recorder 52 as previously described.

From the foregoing description of a preferred embodiment of this invention it should be apparent that there has been provided a filter arrangement for use with an infrared analyzer whereby acetylenes can be detected. While this filter system has been described in conjunction with a simple Wheatstone bridge measuring circuit it should be apparent that various other systems can be employed to measure and compare the intensities of radiation of the two beams. One such system comprising a self-balancing bridge circuit with automatic standardization is disclosed in United States Patent 2,579,825. Another alternative is to employ a pair of sensitive thermocouples as the detecting elements. It should also be apparent that the output electrical signal can be employed if desired to control any selected process variable affecting the sample stream under analysis.

Quartz filter 69 and windows 66 can be replaced by sapphire windows if desired. Sapphire transmits practically all radiation of wave lengths shorter than approximately 4 microns and practically no radiation of wave lengths longer than approximately 6 microns. While only the methyl acetylene, ethyl acetylene and vinyl acetylene infrared absorption characteristics are illustrated in Figure 3 it is to be understood that the absorption characteristics of acetylene are quite similar to those of the three substituted acetylenes illustrated, and as such acetylene can also be detected if present in the sample stream. Although the acetylene detecting system of this invention has been described in conjunction with a sample stream containing butadiene and butenes, the scope of the invention is by no means limited thereto. Acetylenes can be detected in the presence of any other materials as long as these other materials do not have strong infrared absorption bands of their own in the wave length region of approximately 2.9 microns. Thus, it is not intended that this invention be limited to the precise embodiments herein illustrated since various modifications obviously can be made by those skilled in the art.

What is claimed is:

1. The method of detecting the presence of acetylenes which comprises establishing two beams of infrared radiation of predetermined intensity, directing both of said beams through a sample of material under analysis, further directing one of said beams through a filter constructed of spinel, and measuring the resulting intensities of the two beams whereby changes in the ratio of intensities is indicative of changes in concentration of acetylenes present in the material under analysis.

2. The method of detecting the presence of acetylenes which comprises establishing two beams of infrared radiation of predetermined intensity, directing both of said beams through a sample of material under analysis, further directing both of said beams through filter means to limit the radiation transmitted to wave lengths shorter than approximately six microns, further directing one of said beams through a filter constructed of spinel, and measuring the resulting intensities of the two beams whereby changes in the ratio of intensities is indicative of changes in concentration of acetylenes present in the material under analysis.

3. The method in accordance with claim 2 wherein said filter means comprises filters constructed of quartz.

4. The method in accordance with claim 2 wherein said filter means comprises filters constructed of sapphire.

5. The method of detecting the presence of methyl acetylene, ethyl acetylene, and vinyl acetylene in a sample stream containing butadiene and butenes which comprises establishing two beams of infrared radiation of predetermined intensity, directing both of said beams through such a sample stream, further directing both of said beams through filters constructed of quartz, further directing one of said beams through a filter constructed of spinel, and measuring the resulting intensities of the two beams whereby changes in the ratio of intensities is indicative of changes in concentration of methyl acetylene, ethyl acetylene and vinyl acetylene present in the sample stream under analysis.

6. An analyzer adapted to detect the presence of acetylenes comprising a sample cell adapted to contain a sample of material under analysis, a source of infrared radiation, means to direct two beams of radiation from said source through said sample cell, a filter constructed of spinel disposed in one of said beams, and radiation detecting means to measure the resulting intensities of said beams whereby changes in the ratio of intensities are indicative of changes in concentration of acetylenes present in the sample cell.

7. The combination in accordance with claim 6 wherein said radiation detecting means comprises temperature sensitive electrical resistance elements connected in a bridge measuring circuit.

8. An analyzer to detect the presence of acetylenes comprising a sample cell having inlet and outlet means whereby a fluid stream under analysis can be circulated therethrough, said cell being provided with windows transparent to infrared radiation of wave lengths shorter than approximately six microns, a source of infrared radiation, means to direct two beams of radiation from said source through said sample cell, a filter constructed of spinel disposed in one of said beams, and radiation detecting means to measure the resulting intensities of said beams whereby changes in the ratio of intensities are indicative of changes in concentration of acetylenes present in the sample cell.

9. The combination in accordance with claim 8 wherein said cell windows are constructed of quartz.

10. The combination in accordance with claim 8 wherein said cell windows are constructed of sapphire.

11. An analyzer adapted to detect the presence of acetylenes comprising a sample cell having inlet and outlet means whereby a fluid stream under analysis can be circulated therethrough, said cell being provided with quartz windows, a source of infrared radiation, means to direct two beams of radiation from said source through said sample cell, a filter constructed of spinel disposed in one of said beams, a filter constructed of quartz disposed in the other of said beams, and a thermal sensitive electrical resistance element disposed in each resulting beam of radiation, said resistance elements being connected in a Wheatstone bridge circuit to detect changes in the ratio of the intensities of radiation impinging upon the two resistance elements.

12. The combination in accordance with claim 11 wherein said sample cell is approximately 15 centimeters long, said quartz windows and said quartz filters are each approximately 1.5 millimeters thick and said spinel filter is approximately 4.0 millimeters thick.

References Cited in the file of this patent

UNITED STATES PATENTS

| | | |
|---|---|---|
| 2,621,297 | Obermaier | Dec. 9, 1952 |
| 2,636,904 | Starr et al. | Apr. 28, 1953 |
| 2,685,649 | Miller | Aug. 3, 1954 |
| 2,690,694 | Wilson | Oct. 5, 1954 |